Nov. 10, 1931.  E. L. GOLDSMITH ET AL  1,830,996
CASTER CONSTRUCTION
Filed May 31, 1930
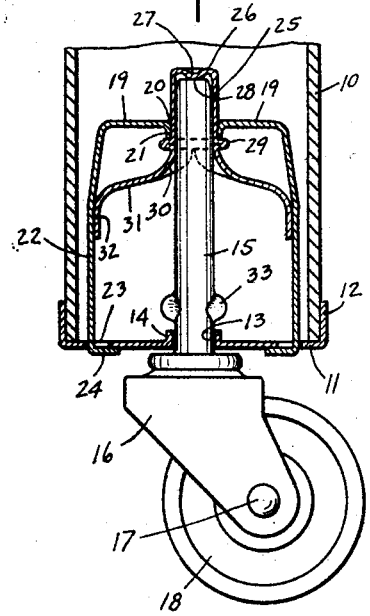
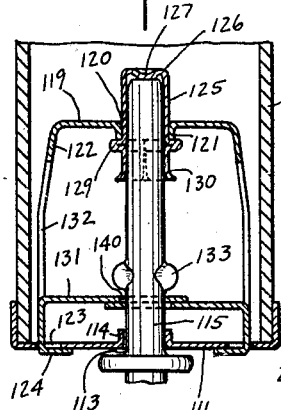
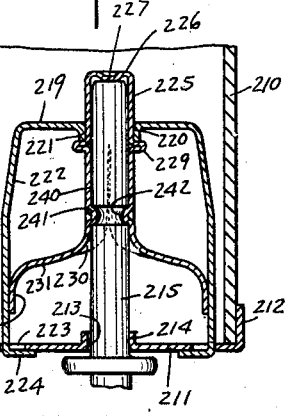
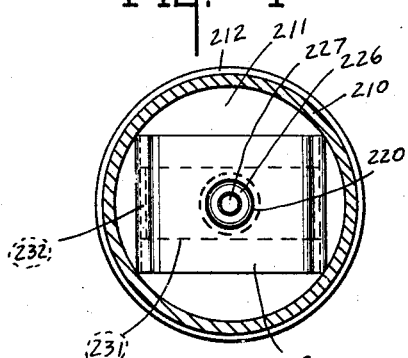
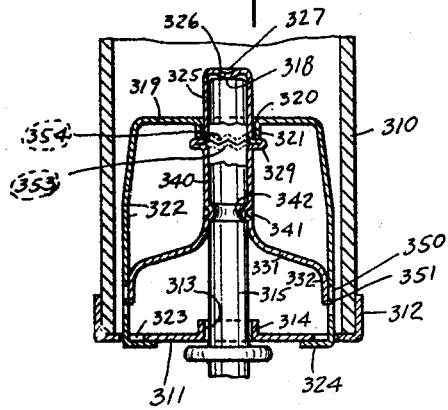
INVENTORS.
ELMER L. GOLDSMITH.
WILLIAM H. NOELTING.
BY
Lockwood Lockwood Goldsmith & Galt
ATTORNEYS.

Patented Nov. 10, 1931

1,830,996

UNITED STATES PATENT OFFICE

ELMER L. GOLDSMITH, OF INDIANAPOLIS, AND WILLIAM H. NOELTING, OF EVANSVILLE, INDIANA, ASSIGNORS TO THE FAULTLESS CASTER COMPANY, OF EVANSVILLE, INDIANA, A CORPORATION

CASTER CONSTRUCTION

Application filed May 31, 1930. Serial No. 458,571.

This invention relates to a caster construction suitable for tubular legs such as the metal bed industry now employs.

The chief object of the invention is to provide a caster retaining frame which may be detachably mounted on a tubular leg of the aforesaid character for transmitting the load to the caster stem and rotatably support said caster stem at at least two spaced annular portions to prevent stem cocking and more especially to provide a top bearing for free swiveling of the stem.

One feature of the invention consists in the provision of an inverted U-shaped frame which supports a cylindrical stem receiving socket, the closed end of which provides a top bearing for the end of the caster stem and which extends an appreciable distance into the central chamber of the frame and which, in a plurality of forms of the invention, is extended for association with the arms of the frame and which in one of the aforesaid forms of the invention, is further arranged for detachably retaining a caster stem in the frame work construction when a detachable type caster and socket are desired.

The full nature of the invention will be understood from the accompanying drawings and the following description and claims:

In the drawings, Fig. 1 is a central sectional view of a load sustaining leg, a caster socket, and an elevational view of a caster mounted therein.

Fig. 2 is a substantially similar view of a modified form of the invention, the caster yoke and wheel being omitted.

Fig. 3 is a similar view of a modified form of the invention, the caster yoke and wheel being omitted.

Fig. 4 is a top plan view of the socket illustrated in Fig. 3, showing the same mounted upon a tubular load sustaining member, the latter being shown in transverse section.

Fig. 5 is a central section of a modified form upon which all claims read.

In the drawings, 10 indicates a tubular leg which herein is illustrated as of a cylindrical outline and which rests upon a load sustaining plate 11, having the upturned ornamental flange 12 surrounding the end of the leg 10. Plate 11 has a central aperture 13 defined by an upturned collar 14. Rotatably mounted in said opening, which is the central opening, and rotatably supported by the collar is a caster stem 15 which supports a yoke 16, in turn supporting through the axle 17 a caster wheel 18. An inverted substantially U-shaped frame having the horizontal transverse portion 19, is centrally apertured as at 20 and the same is defined by an annular collar 21 extending, in this instance, angularly and towards the collar 14. Each arm 22 extends downwardly from the transverse portion 19 and herein the arms are positioned upon opposite sides of the transverse strip portion 19 and extend through apertures 23 formed in the plate 11. The lower free ends of the arms are turned angularly as at 24 and herein the ends are turned inwardly and towards each other. The length of the radial slot 23 is greater than the thickness of the arm 22, thereby permitting the arm to spring or flex outwardly and likewise flex inwardly, if desired, particularly for mounting purposes and also for accommodation relative to the various internal diameters of tubular legs of the same commercial size. The length of the angular end 24 is greater than the length of the open slot 23 so that each arm is prevented against longitudinal separation relative to the supporting plate.

In the central opening 20 is mounted a cylindrical stem receiving bearing or socket tube 25 which extends outwardly and upwardly beyond the central opening and terminates in a closed end 26, which herein shown as indicated at 27, providing a top bearing for the end 28 of the stem 15. The top bearing and lateral confining tube is retained against longitudinal displacement from the socket opening 20 by the flange 29 formed integral with and by laterally enlarging a portion of the tube. The tube is formed of a single strip of metal doubled upon itself and each free end beyond the flange, as shown in Fig. 1, is flared outwardly as at 30 and in Fig. 1 the same is extended laterally and downwardly as at 31 and terminates in a vertical portion 32, substantially parallel to the arm portion and arranged to bear or slide thereon inward flexing of the arm slides the arm upon the reinforcing strut extension of the tube. This arrangement insures longitudinal alignment of the tube in the socket opening 20 and likewise insures outwardly extension of the arms into engagement with the side walls of the tubular load object 10.

In Fig. 1 the caster socket and the caster are shown as a permanent combination and the caster stem is prevented from axial separation or dropping out of the socket by having a suitable enlargement and herein a pair of oppositely directed wings 33 are shown. These are positioned immediately above collar 14. The caster stem, therefore, has some axial movement and is of the free swiveling type and is of the top bearing type.

Fig. 2, a modified form of the invention, is illustrated and in this figure, numerals of the one hundred series indicate similar parts. The load 110 supported by the plate 111 centrally apertured as at 113, is provided with collar 114 which rotatably supports the caster stem 115. The plate may be provided with the ornamental peripheral portion 112, if desired. The U-shaped arms 122 depend from the transverse portion 119 which is centrally apertured as at 120 and defined by collar 121. Said aperture and collar receives the tubular socket member 125, terminating in the closed end 126 and suitably fashioned for pivotal bearing as at 127. The tube retained against longitudinal displacement and separation by the lateral enlargement 129 and the ends of the strip forming the tube are extended angularly and flared outwardly as at 130 for stem reception. The caster stem 115 is laterally enlarged as at 133 but instead of this enlargement being immediately above collar 114, the same is positioned above the laterally directed wings 131 of the tongue portion struck from the arm portion 122, as by slotting the central portion thereof as at 132.

Each tongue extends toward the opposite tongue and overlaps the same and each terminates in a recess 140 which is of considerable larger diameter than the stem 115 so that lateral binding upon the stem by said tongues is prevented.

The lower ends of each of the arms 122 extend inwardly and laterally as at 124 and the arms themselves pass through the elongated radial positioned slots 123 in the plate.

In this form of the invention the tongues in a sense, constitute a stem centering portion and are associated with the lower portion of the inverted U-shaped spring frame, whereas the tongues 31, see the modification shown in Fig. 1, are associated with the upper portion of the U-shaped spring.

Fig. 3 illustrates a modification of the invention which not only embodies a detachable type or relationship between the caster stem and the socket but which illustrates a modification wherein the elongated cylindrical top bearing socket is extended inwardly, downwardly and outwardly into co-operating relationship with the lower portion of the inverted U-shaped frame.

In this figure similar parts are indicated by numerals of the two hundred series. For example, 210 indicates the tubular leg, 211 the load supporting plate, 212 the leg mount flange peripherally enveloping the leg, 213 the central plate aperture, 214 the collar defining the same, 215 the caster stem rotatably supported thereby. The inverted U-shaped frame includes the portion 219, terminating in downwardly extending arms 222, each of which passes through a radially elongated slot 223 in the plate and terminates in an angularly and inwardly extended end 224, which unites the inverted U-shaped strip to the plate for transmitting the load from the plate to the caster stem and through the elongated cylindrical top bearing and laterally centering tube 225, mounted in the aperture 220 defined by the inwardly directed collar 221.

Said tube 225 terminates in the closed end 226 and a pivot formation 227 is formed therein. The tube is prevented from longitudinal displacement outwardly on the application of load by the end portions of the strip forming said tube being extended laterally as at 229. The ends of the tube are extended inwardly and substantially parallel to the top portion of the tube as at 240 for centering the tube and each portion is indented as at 241 for yieldingly seating in groove 242 formed in the stem 215. The aforesaid yieldingly retains the stem in association with the caster socket. Each end of the strip forming the tube is flared outwardly as at 230 for facility in seating the stem in the tube.

The flared portions 230 in the present form of the invention are extended as at 231 downwardly and outwardly toward the arm portions and terminate in longitudinally directed portions 232 which engage the arm portions 222 of the inverted U-shaped frame and coact therewith substantially as set forth relative to the similar portions illustrated in Fig. 1.

In the forms of the invention illustrated in Figs. 1, 2 and 3, the tube was assumed to be press fitted into the horizontal portion of the spring frame. However, the tube may be loosely mounted therein. When so mounted rotation thereof is to be prevented. Herein the collar 321 has a serrated edge 354 engaged by the corresponding wave-like or corrugated portion 353 of the tube bead or collar 329. Also if desired the spring arm 322 may be slotted (see also Fig. 2) and the outwardly extending portion 331 of the cap which includes portion 332 slidable on arm 322 may include a reduced interlocking transverse extension 351 seatable in slot 350 of arm 322.

In all of the forms of the invention shown in Figs. 1, 2, 3 and 5, the ends of the frame immediately above plate 11, 111, 211 and 311, respectively, may be reduced in width, permitting a narrow slot 23, 123, 223 and 323, to be formed in the supporting plate or the full width angular end may be employed and associated therewith the full width slot.

The invention claimed is:

1. The combination with a tubular leg, a load supporting centrally apertured plate, and a caster having a stem swiveled therein for supporting the leg, of an inverted U-shaped frame having its lower ends connected to the plate but permitting transverse separating movement of the arms for engagement with the interior of said leg, said frame including a central aperture in alignment with the plate aperture, an elongated closed end cylindrical tube seatable in the frame aperture and connected with the plate and only through the arms thereof, said tube including a lateral enlargement intermediate its ends and positioned within the frame for preventing outward axial movement of the tube in the frame, said tube including a flared mouth for stem reception.

2. The combination with a tubular leg, a load supporting centrally apertured plate, and a caster having a stem swiveled therein for supporting the leg, of an inverted U-shaped frame having its lower ends connected to the plate but permitting transverse separating movement of the arms for engagement with the interior of said leg, said frame including a central aperture in alignment with the plate aperture, an elongated closed end cylindrical tube seatable in the frame aperture and connected with the plate and only through the arms thereof, said tube including a lateral enlargement intermediate its ends and positioned within the frame for preventing outward axial movement of the tube in the frame, said tube including a flared mouth for stem reception, and means extending transversely from a point of stem contact to the adjacent frame arm and operatively associated therewith.

3. The combination with a tubular leg, a load supporting centrally apertured plate, and a caster having a stem swiveled therein for supporting the leg, of an inverted U-shaped frame having its lower ends connected to the plate but permitting transverse separating movement of the arms for engagement with the interior of said leg, said frame including a central aperture in alignment with the plate aperture, an elongated closed end cylindrical tube seatable in the frame aperture and connected with the plate and only through the arms thereof, said tube including a lateral enlargement intermediate its ends and positioned within the frame for preventing outward axial movement of the tube in the frame, said tube including a flared mouth for stem reception, and means extending transversely from a point of stem contact to the adjacent frame arm and operatively associated therewith, said means comprising oppositely directed extensions on said tube and terminating in free ends bearing upon said arms.

4. A caster socket including a centrally apertured load sustaining plate, an inverted U-shaped frame having an aperture therein in alignment with the plate aperture and an inwardly directed collar defining the same, a tube having a closed end and mounted within said frame aperture and having an enlargement opposite the closed end and engaging the collar for limiting axial separation of the tube and frame, said tube having a flared open end for stem reception.

5. A caster socket including a centrally apertured load sustaining plate, an inverted U-shaped frame having an aperture therein in alignment with the plate aperture and the inwardly directed collar defining the same, a tube having a closed end and mounted within said frame aperture and having an enlargement opposite the closed end and engaging the collar for limiting axial separation of the tube and frame, said tube having a flared open end for stem reception, said flared end of the tube comprising a pair of outwardly and downwardly extending extensions terminating adjacent the frame and bearing upon the arms thereof.

6. A caster socket including a centrally apertured load sustaining plate, an inverted U-shaped frame having an aperture therein in alignment with the plate aperture and the inwardly directed collar defining the same, a tube having a closed end and mounted within said frame aperture and having an enlargement opposite the closed end and engaging the collar for limiting axial separation of the tube and frame, said tube having a flared open end for stem reception, said flared end of the tube comprising a pair of outwardly and downwardly extending extensions terminating adjacent the frame and bearing upon the arms thereof, said tube intermediate the lateral enlargement and the frame arm engaging portion including an inwardly directed stem seating portion for frictionally retaining a stem within the tube and plate.

7. The combination with a tubular leg, a load supporting centrally apertured plate and a caster having a stem swiveled therein for supporting the leg of an inverted U-shaped frame having its lower ends connected to the plate but permitting transverse separating movement of the arms for engagement with the interior of said leg, said frame including a central aperture in alignment with the plate aperture, an elongated closed end cylindrical tube seatable in the frame aperture and connected with the plate and only through the arms thereof, said tube including a lateral enlargement within the frame for preventing outwardly axial movement of the tube within the frame, said tube including a flared mouth for stem reception, the tube enlargement having a wave like corrugation and said frame including a collar defining the central aperture and extending inwardly toward the plate and having serrated edge for nonrotative connection with the tube enlargement.

8. The combination with a tubular leg and load supporting central apertured plate and a caster having a stem swiveled therein in supporting the leg in an inverted U-shaped frame having its lower ends connected to the plate but permitting transverse separating movement of the arms for engagement with the interior of said leg, said frame including a central aperture in alignment with the plate aperture, an elongated closed end cylindrical tube seatable in the frame aperture and connected with the plate and only through the arms thereof, said tube including a lateral enlargement within the frame preventing outward axial movement of the tube in the frame, said tube including a flared mouth for stem reception, and means extending transversely from the point of stem contact to the adjacent frame arm and operatively associated therewith, said means comprising oppositely directed extensions on said tube and terminating in free ends bearing upon said arms, each frame arm including an elongated slot therein and said tube extensions terminating in transverse portions slidable in said slots.

9. The combination with a tubular leg and load supporting central apertured plate and a caster having a stem swiveled therein in supporting the leg in an inverted U-shaped frame having its lower ends connected to the plate but permitting transverse separating movement of the arms for engagement with the interior of said leg, said frame including a central aperture in alignment with the plate aperture, an elongated closed and cylindrical tube seatable in the frame aperture and connected with the plate and only through the arms thereof, said tube including a lateral enlargement within the frame preventing outward axial movement of the tube in the frame, said tube including a flared mouth for stem reception, and means extending transversely from the point of stem contact to the adjacent frame arm and operatively associated therewith, said means comprising oppositely directed extensions on said tube and terminating in free ends bearing upon said arms, each frame arm including an elongated slot therein and said tube extensions terminating in transverse portions slidable in said slots, said tube enlargement having a wave like corrugation and said frame including a collar defining the central aperture and extending inwardly toward the plate and having a serrated edge for nonrotative connection with the tube enlargement.

10. The combination with a tubular leg, a load supporting, centrally apertured plate, and a caster having a stem swiveled therein for supporting the leg, of an inverted U-shaped frame having its lower ends connected to the plate but permitting transverse movement of the arms for engagement with the interior of said leg, said frame including a central aperture in alignment with the plate aperture, an elongated closed end cylindrical tube seatable in the frame aperture and connected with the plate and only through the arms thereof, said tube including a lateral enlargement intermediate its ends and positioned within the frame for preventing outward axial movement of the tube in the frame, and wings extending transversely from adjacent points of stem contact to the adjacent frame arms and operatively associated therewith.

In witness whereof, we have hereunto affixed our signatures.
ELMER L. GOLDSMITH.
WILLIAM H. NOELTING.